D. HAM.

Attaching Rubber Tires to Carriage Wheels.

No. 92,606.

Patented July 13, 1869.

United States Patent Office.

DANIEL HAM, OF IOWA CITY, IOWA.

Letters Patent No. 92,606, dated July 13, 1869.

---

IMPROVED MODE OF ATTACHING RUBBER TIRES TO CARRIAGE-WHEELS.

---

The Schedule referred to in these Letters Patent and making part of the same.

---

*To all whom it may concern:*

Be it known that I, DANIEL HAM, of Iowa City, county of Johnson, and State of Iowa, have invented new and useful "Improvements in Velocipede-Wheels;" and I do hereby declare the following to be an exact description thereof, reference being had to the accompanying drawings, and to the letters of reference marked thereon, making a part of this specification, in which—

Figure 1:
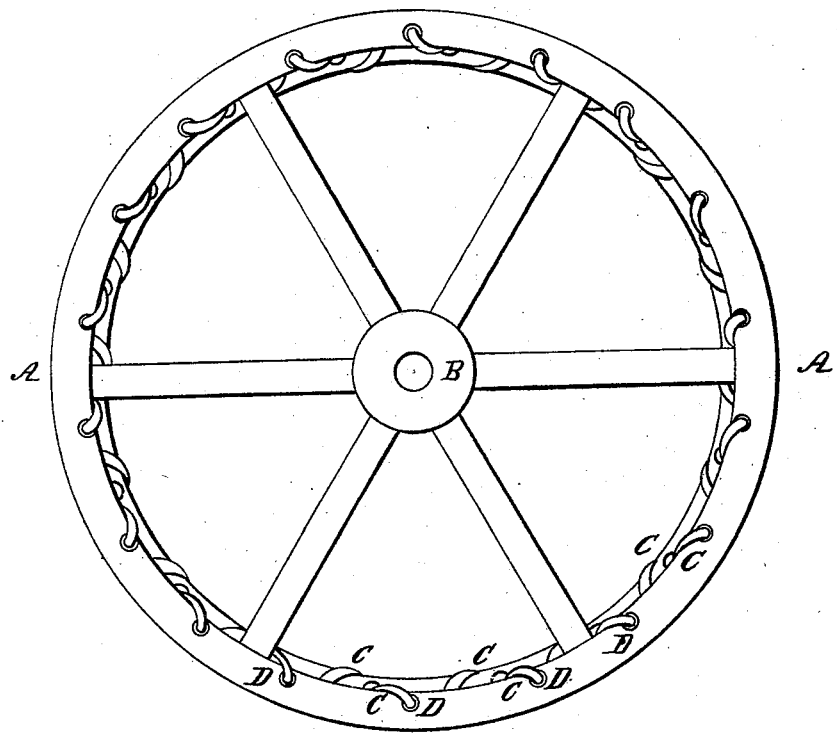

Figure 1 represents a side elevation of the wheel, with the elastic or rubber tire laced around the rim of the wheel.

Figure 2:
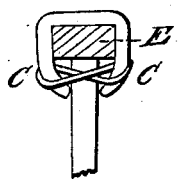

Figure 2 exhibits a cross-section of the rim of the wheel.

The nature of my invention consists in the application of an elastic or India-rubber covering around the rim or tire of the wheel, so as to answer the purpose of an outside elastic tire, movable at pleasure, having eyelets along the sides of the covering, so that it can be laced together with lacers of twine, cord, or wire, on the inside of the rim, binding it firmly fast to the rim, and easily unlaced and removed when required.

The object of my invention is to add traction to the wheel, which will increase the speed of the wheel, and prevent the wheel from slipping on smooth floors and soft places, which frequently is the case with the present wheels of velocipedes, particularly with pupils learning to ride, and not understanding the management of the wheels, being suddenly turned, slip and fall to the ground with force; and in large halls where pupils are being taught, the floors soon become creased and soiled, and so smooth that they become dangerous to practise on, and many pupils have been injured and the floors completely ruined, but with my invention the wheels are much more easily managed. They can be used with perfect safety and greater advantage on ice in the winter-season. They can be used on any floor without soiling it, even in parlors, without doing the least damage. And another advantage, perfectly free from noise on any kind of a floor. And in case of a collision, or running against any person, or any fine piece of furniture, the wheels will do no hurt or damage.

To enable others to make and use my invention, I will proceed to describe it, as follows:

A represents an elastic or India-rubber band, drawn tightly around the periphery or rim of a velocipede-wheel B, (the rim may be of iron or wood,) so that the face and sides of the rim E are covered with the band, the band being so constructed as to be applied to velocipede-wheels now in use by having eyelets D along both edges or sides of it, near the edges of the band, and firmly fastened to the band.

Lacers C are then used to run through each eyelet D, from side to side, drawing the sides closely together on the inside of the rim or felloes of the wheel, thus firmly securing this elastic tire, or outside covering to the rim of the wheel, and again easily unlaced and removed from the wheel whenever desired.

I am aware of India-rubber tire being fastened to buggy and sulky-wheels, but these I do not claim; but

What I claim as my invention, and desire to secure by Letters Patent, is—

The application of an elastic and movable band, A, to the rim E of a velocipede-wheel, B, when secured by lacers C and eyelets D, or their equivalents, so as to be easily attached to the wheel and quickly removed, when required, as herein described and for the purposes set forth.

DANIEL HAM.

Witnesses:
J. FRANKLIN REIGART,
EDM. F. BROWN.